United States Patent
Bealkowski et al.

(10) Patent No.: US 6,378,027 B1
(45) Date of Patent: Apr. 23, 2002

(54) SYSTEM UPGRADE AND PROCESSOR SERVICE

(75) Inventors: Richard Bealkowski, Redmond, WA (US); Sudhir Dhawan, Austin, TX (US); Kenneth Claude Hinz, Rochester, MN (US); Peter Matthew Thomsen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/281,080

(22) Filed: Mar. 30, 1999

(51) Int. Cl.[7] .............................................. G06F 13/00
(52) U.S. Cl. ..................... 710/302; 710/307; 710/260; 710/302; 709/223; 709/224; 709/227; 714/10; 714/11; 714/13; 713/300; 713/320
(58) Field of Search ................................. 710/260–266, 710/300–304; 709/223, 224, 227; 714/10, 11, 13; 713/300–340

(56) References Cited

U.S. PATENT DOCUMENTS

| 5,202,965 A | * | 4/1993 | Ahn et al. ................... 710/103 |
| 5,349,664 A | * | 9/1994 | Ikeda et al. ..................... 713/2 |
| 6,282,596 B1 | * | 8/2001 | Bealkowski et al. ......... 710/103 |
| 6,295,591 B1 | * | 9/2001 | Bealkowski et al. ......... 711/165 |

OTHER PUBLICATIONS

IBM Technical Disclosure Bulletin, vol. 37, No. 09, Sep. 1994, "Hardware/Software Interface for Turning On/Off Processors in a Multi–Processor Environment", pp. 365–367.*

IBM Technical Disclosure Bulletin, vol. 38, No. 12, Dec. 1995, "Selection Mechanism for Active vs. Backup Processor", pp. 75–78.*

* cited by examiner

Primary Examiner—Rupal Dharia

(57) ABSTRACT

A method of servicing a processor array of a computer system by quiescing a processor selected for maintenance and removing the selected processor from a processor pool used by the computer's operating system. The selected processor is then powered down while maintaining power to and operation of other processors in the processor array. The selected processor may be identified as being defective, or may have been selected for upgrading. The processor array may include several processor clusters, such that the quiescing, removing and powering down steps apply to all processors in one of the processing clusters. The operating system assigns one of the processors in the processor array to be a service processor, and if the service processor is the processor selected for maintenance, the OS re-assigns the service processor functions to another processor in the processor array.

20 Claims, 2 Drawing Sheets

SYSTEM UPGRADE AND PROCESSOR SERVICE

BACKGROUND OF THE INVENTION

1. Field of the Invention

The present invention generally relates to computer systems, and more specifically to a method of upgrading or servicing computer components, particularly processing units in a multiprocessor computer system, without powering down the computer system or otherwise interrupting service.

2. Description of Related Art

Modern computing systems are often constructed from a number of processing units and a main memory, connected by a generalized interconnect. The basic structure of a conventional multi-processor computer system 10 is shown in FIG. 1. Computer system 10 has several processing units (CPUs) 12a, 12b, and 12c which are connected to various peripheral, or input/output (I/O) devices 14 (such as a display monitor, keyboard, and permanent storage device), memory device 16 (random-access memory or RAM) that is used by the processing units to carry out program instructions, and firmware 18 whose primary purpose is to seek out and load an operating system from one of the peripherals (usually the permanent memory device) whenever the computer is first turned on.

Processing units 12a–12c communicate with the peripheral devices, memory and firmware by various means, including a bus 20. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter might be used to control a video-display monitor, a memory controller can be used to access memory 16, etc. The computer can also have more or less than three processing units. In a symmetric multiprocessor (SMP) computer, all of the processing units 12a–12c are generally identical, that is, they all use a common set or subset of instructions and protocols to operate, and generally have the same architecture.

Conventional computer systems often allow the user to add various components after delivery from the factory. For peripheral devices, this can be accomplished using an "expansion" bus, such as the Industry Standard Architecture (ISA) bus or the Peripheral Component Interconnect (PCI) bus. Another component that is commonly added by the user is main memory. This memory is often made up of a plurality of memory modules that can be added or removed as desired. Even processing units can be added or swapped out, in more recent computer designs.

Processing units can be added to upgrade a system, or to replace older units that have become defective. A processing unit has typically has several execution units, one or more dispatch units, branch units, load/store units, and arithmetic units such as floating point and fixed point units, along with several types of registers used to hold data. In addition, a processing unit usually has on-board instruction and data caches, and various other features such as a translation lookaside buffer. Consequently, as the architectures within the processing units improve, it is desirable to upgrade to the better (faster) architectures, and higher processor clock speeds. A processing unit may be added using a connector (socket) mounted on a processor card or on the primary circuit board ("motherboard") of the computer system. These sockets include retention tabs that latch to allow the easy removal of the processors from the computer system, while securely retaining them in the sockets against vibrations, shocks, or inadvertent removal.

When a user desires to upgrade or service the system, the computer must generally be powered down prior to addition or replacement of a processor. After the maintenance is performed, the computer is re-started, and the basic input-output system (BIOS) residing in the firmware tests the processors, and makes them available to the operating system which is thereafter loaded by the firmware.

For many computer systems (particularly large servers used in a client-server network), there may be hundreds of users connected to it, and the down time required to perform a processor upgrade and service can be extremely expensive. Also, in systems which are used in mission-critical applications, it is highly desirable to be able to perform a processor upgrade and service operation without service interruption, particularly when it is necessary to replace defective processors.

One approach to completely avoiding the need for processor service is to simply provide extra, redundant processors so that any defective unit may be idled without noticeable affect on the system. This approach is, of course, extremely inefficient and very expensive, especially if the basic system operation requires a large number of processors, necessitating a large number of redundant processors. Also, this approach cannot be used to avoid service interruption for processor upgrade. It would, therefore, be desirable to provide a method of upgrading or servicing a system's processors without requiring a powering down or interruption of the system, and which further did not require redundant processors that are so wasteful.

SUMMARY OF THE INVENTION

It is therefore one object of the present invention to provide an improved method of upgrading and servicing components of a computer system.

It is another object of the present invention to provide such a method that allows the processing units of the computer system to be individually upgraded or serviced, without interrupting system operation.

It is yet another object of the present invention to provide such a method that does not require the inefficient use of redundant processors.

The foregoing objects are achieved in a method of providing maintenance for a processor array of a multiprocessor computer system, generally comprising the steps of quiescing a processor in the processor array selected for maintenance by completing program instructions assigned to the selected processor without assigning new instructions to the selected processor, removing the selected processor from a processor pool used by an operating system of the computer system, and powering down the selected processor while maintaining power to and operation of at least one other processor in the processor array. The selected processor may be identified as being defective, or may just have been selected for upgrading. In one implementation, the processor array includes a plurality of processor clusters, each cluster having at least two processors, and the quiescing, removing and powering down steps apply to all processors in one of the processing clusters. After servicing the processor, the cluster can be powered up and added back to the processor pool.

The processor service program may be embedded in the operating system (OS). The OS assigns one of the processors in the processor array to be a service processor, and the quiescing step is carried out by the service processor modifying an instruction distribution mechanism to exclude use of the selected processor. If the service processor is the processor selected for maintenance, the OS re-assigns the service processor functions to another processor in the processor array.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
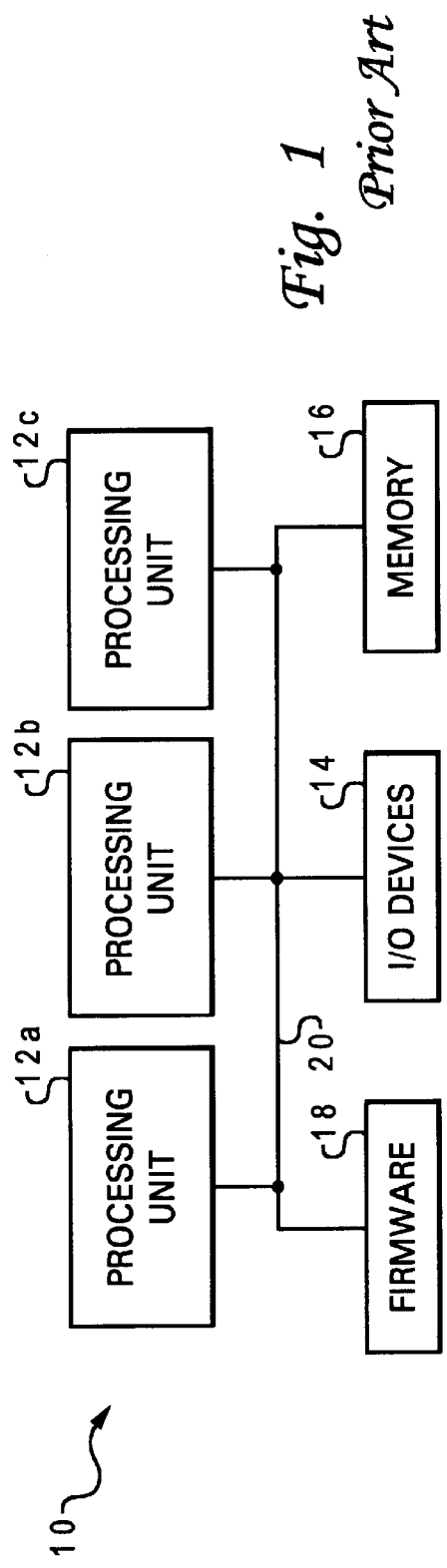
FIG. 1 is a block diagram of a prior-art multiprocessor computer system.
Figure 2:
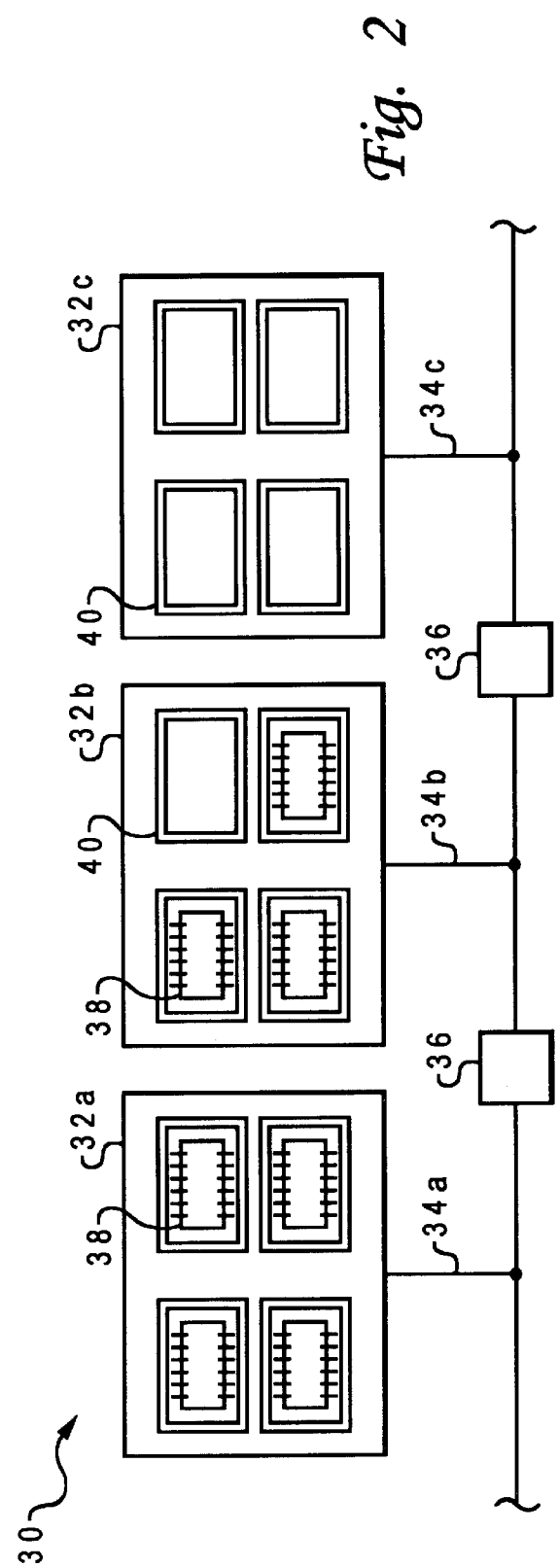
FIG. 2 is a block diagram illustrating a processor array having a plurality of processing clusters of a computer system constructed in accordance with the present invention, allowing processor upgrade or service without interrupting the computer's operation.

With reference now to the figures, and in particular with reference to FIG. 2, there is depicted one embodiment of a computer system having a processor array 30 constructed in accordance with the present invention. In this embodiment, processor array 30 includes a plurality of processing clusters 32a, 32b and 32c, connected by respective processor buses 34a, 34b and 34c to system interconnects 36. Each processing cluster is adapted to receive a plurality of individual processors 38. A given processor 38 is physically mounted on a processor board, and electrically connected to various leads on the board, using a socket 40. In the depicted embodiment, each processing cluster is a processor quad, that is, having four sockets 40 and so receiving a maximum of four processors 38 as shown with cluster 32a. A given cluster may have more or less than four processors, however, as shown with cluster 32b, or have no processors, as with cluster 32c.

Each processor 38 includes various components such as execution and arithmetic units, dispatch and branch units, general purpose and special purpose registers, and on-board instruction and data caches (L1 caches). Other components, such as additional (external) caches L2 and L3 may be provided at each processing cluster. The PowerPC™ processor made by International Business Machines Corp. (IBM—assignee of the present invention) may be used for processors 38.

The computer system includes firmware that loads an operating system into system memory, and the operating system provides an interface between the hardware and software applications (programs). The operating system may reside on a permanent storage device of the computer system, i.e., a "hard disk drive," or direct access storage device (DASD). The storage device and system memory are coupled to processor array 30 via system interconnects 36.

The operating system (OS) is adapted to utilize several processors in carrying out program instructions, and preferably is designed to utilize the full number of processors that are available via processor slots 40. One OS that may be adapted according to the teachings of the present invention is IBM's AIX operating system for servers. The OS selects one of the plurality of processors 38 to be a service processor (for example, the processor located in the first slot of the first cluster), primarily dedicated to dispatching tasks and managing information relating to the basic functioning of the operating system itself, such as handling device drivers and features of the graphical user interface (GUI) that is employed to present information to the user, and allow the user to input system commands.

The OS also uses the service processor to distribute program instructions among the other processors. Program instructions so distributed may relate to the OS itself, or be issued by other software applications. A program may be broken down into a plurality of instructions, referred to as threads, that represent a basic unit of sequential operations to be carried out. The service processor allocates program instructions to the other processors by sending one or more threads to a given processor. In this manner, a single program running on the computer may actually be distributed to all of the processors (an unusual occurrence unless the program is extremely data intensive). Of course, the service processor can itself be used to process instructions that are not OS-related, i.e., that are generated by miscellaneous software applications such as word processing programs, spreadsheets, data analysis, etc.

During operation of the computer system, it may become desirable to upgrade the system, by replacing one or more processors 38 with newer processors having different (improved) architectures, and/or faster processor clock speeds. It may also become desirable to add processors via empty slots 40. Alternatively, it may become necessary to service the system by replacing one or more defective processors. The present invention allows the user to perform all of the foregoing, without interruption (power down) of the computer system.

Figure 3:
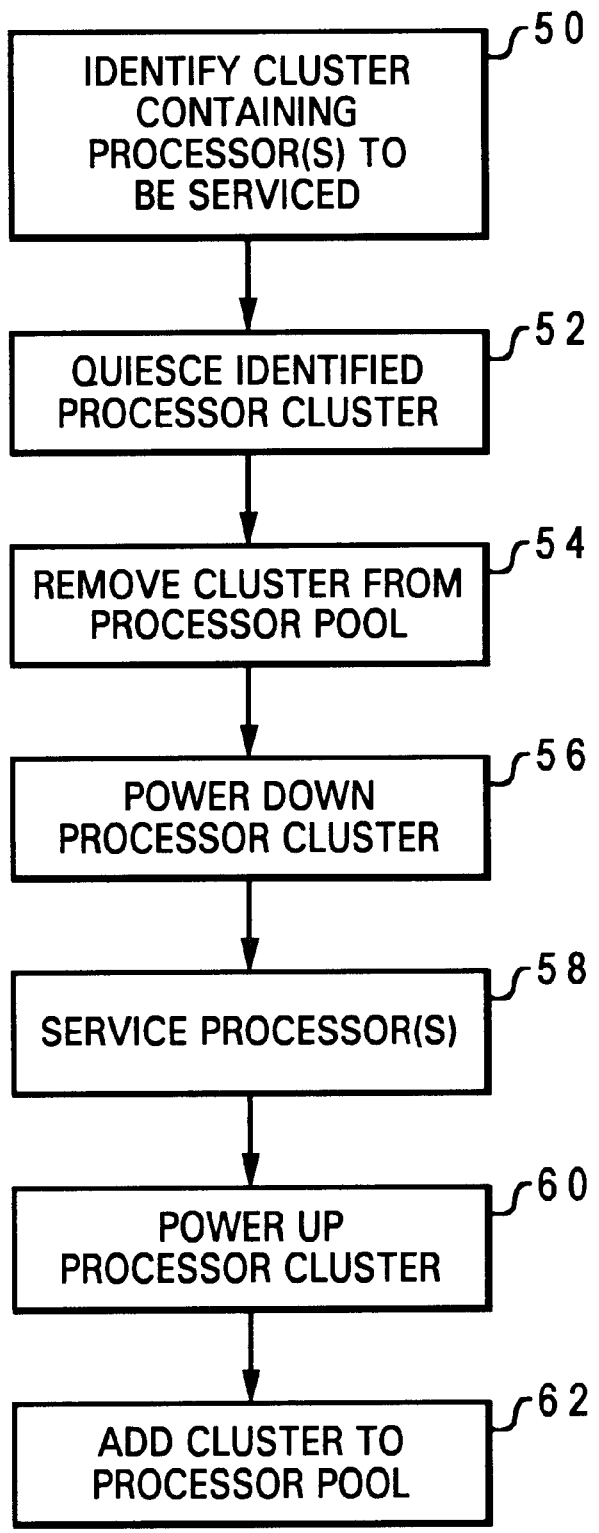
FIG. 3 is a flow chart illustrating the method of the present invention for providing processor upgrade or service.

In the illustrative embodiment, the OS is empowered to quiesce a processor quad (cluster), and effectively remove (isolate) it from the OS processor pool. The GUI presented by the OS includes such a command available from, e.g., a list of system-level commands contained in a system options window. As shown in FIG. 3, upon selection of this command, and identification of the specific quad to be quiesced (50), the service processor modifies its allocation mechanism to exclude use of the processors in the quad to be quiesced (52). Threads already assigned to those processors are completed and, once no more instructions are being carried out by those processors, the operating system may signal to the user that the processors have been removed from the OS pool (54). The processor board having the quiesced cluster is then powered down (56), either manually, or preferably automatically using the service processor. Separate power lines are accordingly provided for each cluster. After servicing (58), the quad is powered back up (60), and added to the OS pool (62). Each processor board can be electrically disconnected from its respective bus and physically removed (from the motherboard) to facilitate access to the processors and slots. Power to the processor boards may be provided using the voltage supply described in U.S. patent application Ser. No. 09/281,082, which is hereby incorporated.

If the service processor is within the cluster that has been selected for service, then the OS can re-assign the service processor (temporarily or permanently) to another processor in another cluster. The processor board is not powered down until transfer of OS threads to the new service processor is complete.

The present invention may be used for several service and upgrade scenarios. Consider, for example, three service scenarios wherein (i) a processor fails a self test during initial program load (IPL), (ii) a processor detects an uncorrectable error during runtime, or (iii) a processor generates multiple correctable errors during run time. In the first case, the processor is identified, held in reset, and the system initialized without including the defective processor. In the latter two cases, the defective processor is identified, held in reset, and the OS removes the processor from the OS pool. When a replacement processor is available, or if the user just wants to inspect the processor board, the OS quiesces the corresponding quad, and removes the quad from the OS pool. After inspection, or replacement of the processor, the quad is powered back up (using the service processor), and added to the OS pool.

In an upgrade scenario wherein additional CPUs are to be added to the system, the user identifies the quad to which processors are to be added and, if that quad already contains processors, the OS quiesces the quad and removes those processors from the OS pool. The quad is powered off (using the service processor), processors are added, and the quad is powered back up, and added to the OS pool. All of the processors can be upgraded by, e.g., replacing clusters in a sequential fashion, repeating the above steps for each cluster.

The present invention thus enables a user to upgrade or service the system while it is still running, with little or practically no effect on service. This feature is particularly useful in systems supporting mission critical applications, or systems with very large numbers of users.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while FIG. 2 and its description refer to processing clusters, it is not necessary to group processors together in this fashion, and the hardware and OS can be adapted to allow the replacement of processors individually with quiescing other processors that are not involved in the service operation. It is therefore contemplated that such modifications can be made without departing from the spirit or scope of the present invention as defined in the appended claims.

What is claimed is:

1. A method of providing maintenance for a processor array of a multiprocessor computer system without interrupting operation of the computer system, comprising the steps of:
    quiescing a processor in the processor array selected for maintenance by completing program instructions assigned to the selected processor without assigning new instructions to the selected processor;
    removing the selected processor from a processor pool used by an operating system of the computer system, after said quiescing step; and
    powering down the selected processor after said removing step while maintaining power to and operation of at least one other processor in the processor array.

2. The method of claim 1 comprising the further step of embedding a processor service program in the operating system, the processor service program carrying out said quiescing, removing and powering down steps.

3. The method of claim 1 comprising the further step of identifying the selected processor as being defective, prior to said quiescing step.

4. The method of claim 1 wherein:
    the processor array includes a plurality of processor clusters; and
    said quiescing, removing and powering down steps apply to all processors in one of the processing clusters.

5. The method of claim 1 comprising the further step of servicing the selected processor after said powering down step.

6. The method of claim 5 comprising the further steps of:
    powering up the selected processor after said servicing step; and
    adding the selected processor to the processor pool, after said powering up step.

7. The method of claim 1 comprising the further step of assigning one of the processors in the processor array to be a service processor, wherein said quiescing step is carried out by the service processor modifying an allocation mechanism to exclude use of the selected processor.

8. The method of claim 7 wherein the service processor is the processor selected for maintenance, and comprising the further step of re-assigning the service processor to another processor in the processor array.

9. A computer system comprising:
    a processor array having a plurality of processing units for carrying out program instructions;
    a storage device coupled to said processing units; and
    program instructions stored on said storage device for (i) quiescing a processing unit in said processor array selected for maintenance, (ii) removing said selected processing unit from a processor pool used by an operating system of the computer system, and (iii) powering down said selected processing unit while maintaining power to and operation of at least one other processing unit in said processor array.

10. The computer system of claim 9 wherein said program instructions further identify said selected processing unit as being defective, prior to quiescing said selected processing unit.

11. The computer system of claim 9 wherein:
    said processor array includes a plurality of processor clusters; and
    said program instructions further quiesce, remove from said processing pool, and power down all processing units in one of said processing clusters.

12. The computer system of claim 9 wherein said program instructions further power up said selected processing unit after being serviced, and add said selected processing unit to said processor pool, after being powered up.

13. The computer system of claim 10 wherein said program instructions further assign one of said processing units in said processor array to be a service processing unit, and said quiescing of said selected processing unit is carried out by said service processing unit modifying an allocation mechanism to exclude use of said selected processing unit.

14. The computer system of claim 13 wherein:
    said service processing unit is the processing unit selected for maintenance; and
    said program instructions further re-assign another processing unit in said processor array as a new service processing unit.

15. A computer program product comprising:
- a storage medium adapted to be read by a computer having a processor array with a plurality of processors; and
- program means stored on said storage medium for (i) quiescing a processor in the processor array selected for maintenance, (ii) removing the selected processor from a processor pool used by an operating system for the computer, and (iii) powering down the selected processor while maintaining power to and operation of at least one other processor in the processor array.

16. The computer program product of claim 15 wherein said program means further identifies the selected processor as being defective, prior to quiescing the selected processor.

17. The computer program product of claim 15 wherein:
- the processor array includes a plurality of processor clusters; and
- said program means further quiesces, removes from the processing pool, and powers down all processors in one of the processing clusters.

18. The computer program product of claim 15 wherein said program means further powers up the selected processor after being serviced, and adds the selected processor to the processor pool, after being powered up.

19. The computer program product of claim 15 wherein said program means further assigns one of the processors in the processor array to be a service processor, and the quiescing of the selected processor is carried out by the service processor modifying an allocation mechanism to exclude use of the selected processor.

20. The computer program product of claim 15 wherein:
- the service processing unit is the processor selected for maintenance; and
- said program means further re-assigns another processor in the processor array as a new service processor.

\* \* \* \* \*